Aug. 29, 1961   C. H. HOFFMAN ET AL   2,998,140
RESIN IMPREGNATED WOOD FILTER PRESS PLATES
AND FRAMES THEREFOR
Filed Feb. 10, 1959   4 Sheets-Sheet 1
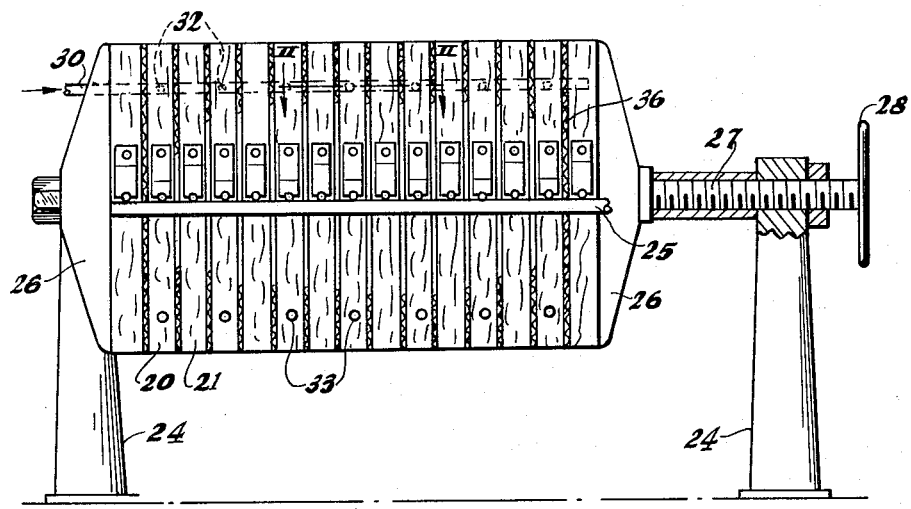
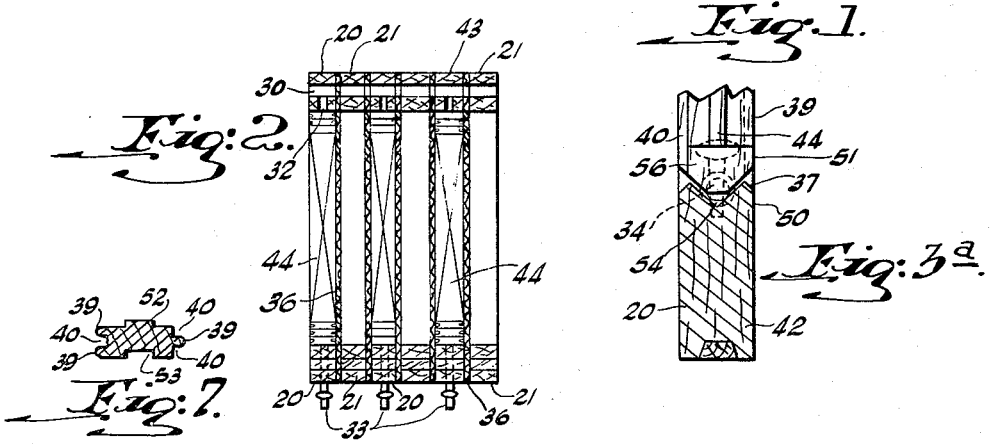
INVENTORS.
CHARLES H. HOFFMAN,
DAN L. DAVIES.
BY Thomas J. P. O'Brien
their ATTORNEY.

Aug. 29, 1961

C. H. HOFFMAN ET AL 2,998,140

RESIN IMPREGNATED WOOD FILTER PRESS PLATES
AND FRAMES THEREFOR

Filed Feb. 10, 1959

INVENTORS.
CHARLES H. HOFFMAN,
DAN L. DAVIES.
BY Thomas J. P. O'Brien,
their
ATTORNEY.

INVENTORS.
CHARLES H. HOFFMAN,
DAN L. DAVIES.
BY Thomas J. D. O'Brien
their ATTORNEY.

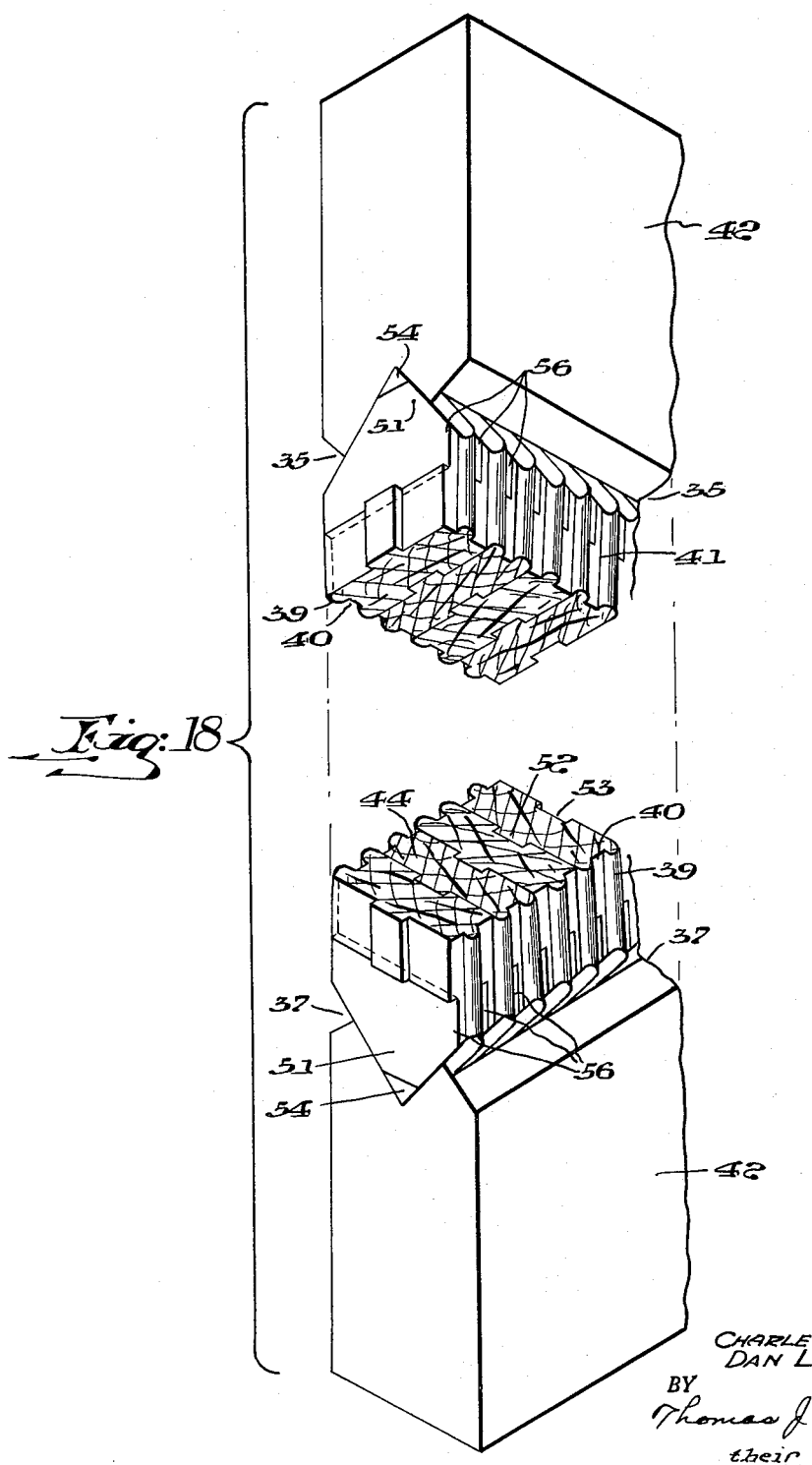

United States Patent Office 2,998,140
Patented Aug. 29, 1961

2,998,140
RESIN IMPREGNATED WOOD FILTER PRESS
PLATES AND FRAMES THEREFOR
Charles H. Hoffman, Pittsburgh, Pa., and Dan L. Davies, Orrville, Ohio, assignors to Koppers Company, Inc., a corporation of Delaware
Filed Feb. 10, 1959, Ser. No. 792,437
4 Claims. (Cl. 210—231)

This invention relates in general to filter presses used to process slurries or suspensions of materials which may be employed to clarify liquids or to filter products from the liquids, and more particularly, to resin impregnated filter press plate and frames therefor of wood.

A primary object of the invention is a mode of construction of wooden press plates and frames for filters which lends itself to manufacture and operation of the parts, particularly in impregnated wood form, in a simpler, more economical, and facile way, employing for the first time the readily available large source of wood material that is in little demand for other purposes, and thus affords an economic source of wood material suitable for filter operation which lends itself to commercial impregnation of the wood with resin preservative, providing greater protection of the plates and frames with preservative, and which is also suitable for machining of the lands, grooves, and of the internesting side grooves and channels of the plate strips in a single machine after impregnation.

With the novel mode of construction of the filter parts of the present invention, there is provided in a sufficiently economical way, a filter press unit assembly of preserved wood which has all the advantages of like parts of metal and plastic materials of long life, ease of cleaning, repair, replacement, and dismantling, while eliminating the disadvantages of such parts as obtains when made of metal and plastic materials.

Wood filter press plates and chamber frames therefor have traditionally been made from solid wood boards or planks, each piece machined individually as might be required for lands and grooves and other functions, depending upon its position in the unit, and the unit assembled and held together with long restraining metal rods through or across the top and bottom of each plate or frame. The planks forming the usual plates customarily are aligned parallel in a vertical position when placed in service in a filter press with portions of the planks at their top and bottom ends, beyond the lands and grooves, forming the horizontal rails between the vertical stiles of the plate frame. The planks forming the usual frames customarily are arranged in a "picture frame" structure constituted of two horizontal rails and two vertical stiles when placed in service in a filter press. For use of wood impregnated with resin, for uniformity of impregnation and preservation, the planks must be cut in lengthwise parts beforehand, and the parts then laminated. When unimpregnated wood plates and frames of standard design are placed in service, they must be permitted to swell before the metal nuts of the restraining metal rods can be finally tightened. Otherwise, the swelling which occurs across the plates would cause compression failures under the nuts and metal washers which may seriously limit the service life of the units.

Since the portions of the planks at the top and bottom ends of the vertical planks that form the horizontal rails in each plate are mated aganst horizontal rails of each frame, the grain of the wood of the plate rails is at right angles to the grain of the wood of the frame rails. Consequently, any unequal swelling of any part of either the press plates or the chamber frames may result in imperfect sealing between the plates and frames and their inability to contain the pressurized liquid within the filter press, which results in the loss of the product being processed. During service, those members that are adjacent each other with the grain mating at right angles to each other may indent one or the other if, for instance, the wood in one plank of a plate is harder than the wood in the adjacent plate planks and also harder than the wood in the mating chamber frame rail. Consequently, when the press is opened for unloading, these units must be perfectly realigned in exactly the same relative positions or the pressurized products may be lost through the new channels formed by indentations in the frame rail.

During service, particularly with liquids which can attack and soften wood, the lands, which together form the drainage grooves in the plates, eventually collapse and are compressed into the drainage grooves. This disadvantageously blocks the drainage grooves and substantially reduces the efficiency and productivity of the filter press. Usually, the entire plate is then discarded because of the failures in the drainage area of the plates.

When used with corrosive liquids, the expensive metal restraining rods which are used to hold standard wooden plates and chamber frames together, are attacked and may ultimataely fail, resulting in additional maintenance time and expense.

Frequently during service, the chamber frame on one side of a press plate will "void," i.e., the entrance hole to the frame becomes plugged and the cavity of the frame cannot be filled with the liquid being processed. As a result, tremendous pressure builds up in the chamber on the opposite side of the impenetrable standard wood plate alongside that void frame, with the result that the plate breaks, material is lost, and the plate must be replaced.

With the plate and frame of this invention, the design is one which will have none of the undesirable features of the standard wood units.

Those objectionable features are corrected with the improved design of this invention by fabricating the plate with wooden parts in such a manner that the form of a "picture frame" structure which it assumes to enclose the drainage area of the adjacent frame has the grain of the wood of all mating members of both plates and frames runs essentially in the same direction. Since wood swells only measurably across the grain, and since the grain of the wood runs lengthwise of the stiles, only the limited crosswise swelling of the stiles affects the width of the plate, presoaking may be eliminated. The drainage area of the plate is constituted of individual drainage "strips" rather than "planks" so machined in a manner with nesting tongues that when they are assembled, they are locked or nest together to act as a unit and create by their lands and grooves the drainage area. "Strips" are sawn timber that are a salvage product of residue formed in sawing "planks" from timber. The stiles and rails of the plate frame are designed of separate plank members so that the plate frame may be dismantled to permit the removal of worn out drainage strips and the insertion of a new set of drainage strips. The joints between the stiles and rails are designed so that the long metal restraining rods may be eliminated and the stiles and rails detachably connected by an all wood detachable interlocking joint. The plate frame rails are designed to removably accommodate the upper and lower ends of the drainage strips and hold them in place in the plate. The design of the individual drainage strips permits easy through passage of liquid from one side of the plate to the other so that equal pressure will be exerted on both sides of the plate at all times.

While the various features aforesaid were primarily designed, and particularly adapted, for coacting together as a unitary whole as a filter press plate and chamber frame therefor, the invention is not limited in all its aspects to the conjoint use of all of these features together as a unitary whole, since much of the advantage of the various novel features are of utility in other relations. For instance, the filter plate features per se are of utility with other types of rails and stiles, and the all wood detachable interlocking joint structure is of utility with vertical grained stiles and horizontally grained rails for other types of land and groove elements as the plate press parts. Hence, the invention is not confined in all its aspects to this specific embodiment hereinafter set forth as the best mode known to the inventor at the time of filing this application.

In addition to the general objects recited above, the invention has for further objects such other improvements or advantages as may be found to obtain in the structure and general operation of filters, particularly all wood filters of the resin impregnated type, as shown on the drawings and hereinafter described or claimed.

In the accompanying drawings:

FIG. 1 is a side elevational view with parts in section of a filter made in accordance with the invention;

FIG. 2 is a horizontal section taken on the line II—II of FIGURE 1;

FIG. 3 is a side elevational view of one side of one of the drainage strips showing the nesting groove;

FIG. 3a is a partial vertical cross-sectional view taken on the line 3a—3a of FIG. 8;

FIG. 3b is a partial sectional and side elevational view of FIG. 3a;

FIG. 4 is an end elevational view of one edge of the drainage strip of FIG. 3 showing a single land and complemental grooves on opposite sides of the land;

FIG. 5 is a side elevational view of the opposite side of the drainage strip of FIG. 3 with its complemental nesting tongue;

FIG. 6 is an end elevational view of the opposite longitudinal edge of said strip showing a pair of lands with a complemental intermediate drainage groove;

FIG. 7 is a horizontal sectional view through the drainage strip, taken on the line VII—VII of FIG. 3;

FIG. 18 is an enlarged perspective view illustrating the mounting of the drainage strips, and the various passages at the edges thereof.

The same reference numerals are used for like parts in each of the several views.

Figure 8:
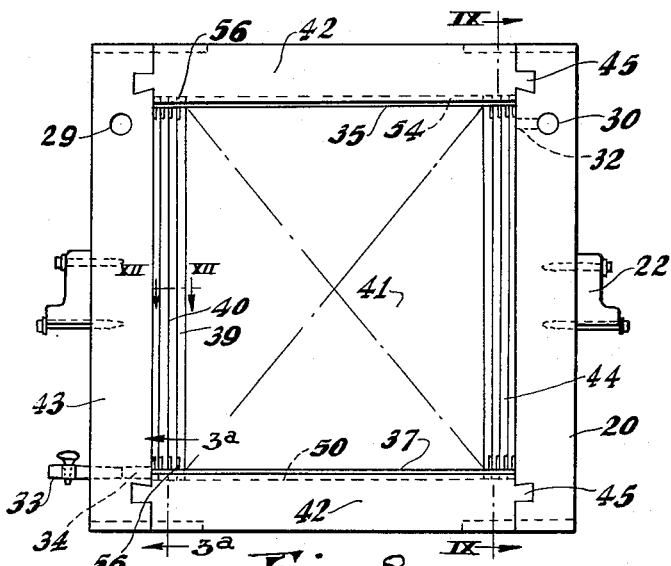
FIG. 8 is a side elevational view of one of the press plates with its parts in fully assembled relation.

Referring to FIGS. 1 and 2 of the drawings, there is shown a standard filter press for various filtering operations, such as clarification, recovering and separation of solid residues from liquid, of alkaline neutral or acid nature, with simple washing, which is readily cleanable, renewable, dismantled and restorable for repair and long-life. As conventional, the filter plate frame 20 and the filter chamber frame 21 are of rectangle form and mounted in alternation between oppositely disposed head liner plates. The frames 20, 21 are provided with handles 22, 23 lined up on a supporting frame comprising standards 24 connected with two parallel rods 25 to support the plate and chamber frames by means of the handles.

The frames are pressed together by pressure heads 26 under the action of a screw spindle 27 and hand wheel 28, and as conventional are provided with the usual channels 29, 30 at their upper corners for introduction of slurry to be filtered to the chamber frames 21 by means of ducts 31, and for introduction of back wash liquor to the plate frames 20 by means of ducts 32 in the plate frames 20, as well as drainage outlets 33 and ducts 34 therefor, all as conventional.

Also as conventional, each press plate 41 and its frame 20 is provided with an upper horizontal cross channel 35 for introduction of the back wash between the plate grooves and the usual filter medium or cloth 36, and a lower horizontal cross channel 37 for drainage from the lands 39 and grooves 40 in the drainage grid portion 41 of the filter plate 20.

In accordance with the present invention, each filter plate 20, as well as each of the filter chamber frames 21, are composed of a wood frame constituted of upper and lower horizontal rails 42 and two vertical stiles 43. The filter chamber frame 21 is devoid or filler or filter medium within the area circumscribed by its rails 42 and stiles 43, whereas the filter plate frame 20 is filled with a drainage area 41 made up of a row of vertical individual wooden drainage strips 44 of sawn timber, which strips are machine profiled, as is to be more fully described.

Preferably, the rails 42, stiles 43, and strips 44, as well as their all wood interlocking corner joints 45, are members which have been thoroughly impregnated and completely penetrated with resin to preserve the wood, by conventional means and methods of wood preserving, either by the well-known full cell or empty cell method of impregnation, to all depths below the surface with resins under pressure. The rails and stiles are preferably constituted of laminated strips of sawn timber from which the strips 44 are formed.

The frames 20, 21, are thus constructed with this novel all wood juncture 45 of their rails and stiles in a leak-proof manner that is dismountable without requiring the use of full length metal restraining rods as heretofore conventional with wooden filter plate frames and chamber frames. Such a detachable joint may be fabricated in any manner similar to those shown in FIGS. 13–17 of the drawings by tongue and groove tapered joints, such as the dovetail joint, in FIG. 14, and the blind mortise joint with dowel pins of FIG. 15, or plain tongue and groove, FIGS. 16 and 17, so that the frame may be disassembled to permit insertion of new drainage strips when required.

Figure 13:
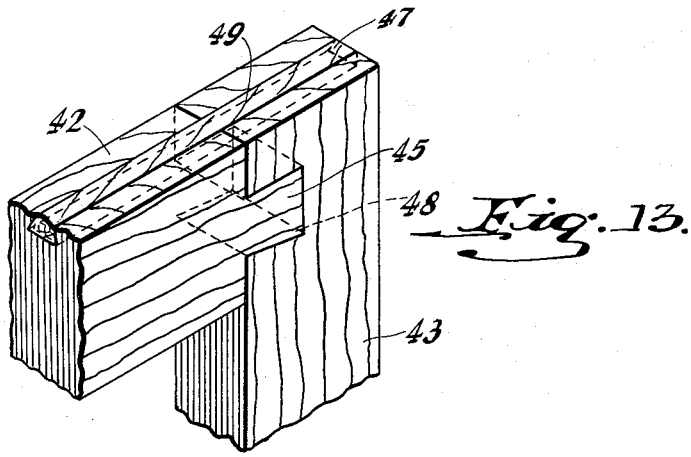
FIGS. 13 to 17 are views illustrating the various forms of wood reinforced all wood detachable interlocking corner joints between the wooden stiles and the rails of the press plate and the chamber frames.
Figure 14:
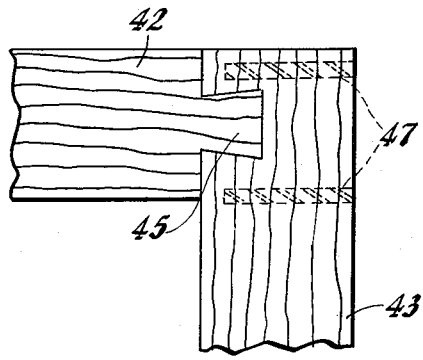
Figure 15:
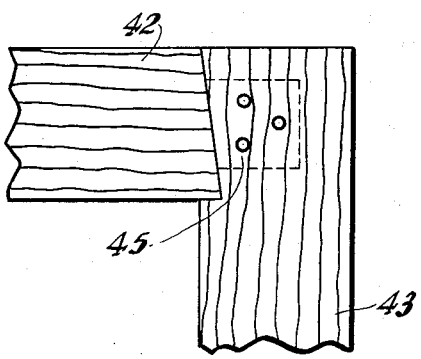
Figure 16:
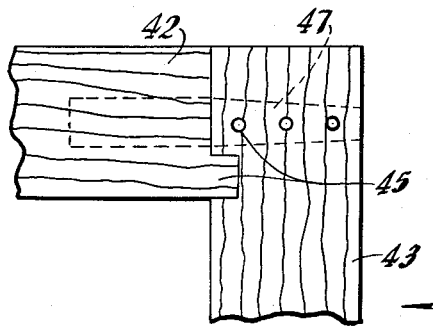
Figure 17:
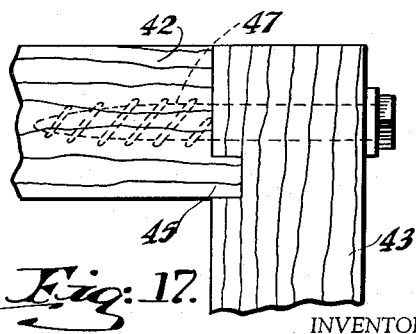

The corners are reinforced by wooden intersectors 47 which intersect the stiles and rails, as by the spiral dowels, FIG. 14, tapered dowel, FIG. 16, and lag screw, FIG. 17. Preferably, as shown in FIG. 13, a tongue and groove in the form of a semi-dovetail is considered best with a wedge line 48 of 10 degrees in the stile and an intersector in the form of a dovetail spline 49.

Figure 9:
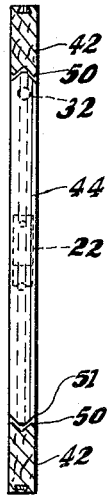
FIG. 9 is a vertical cross-section through the same on the line IX—IX of FIG. 8.
Figure 10:
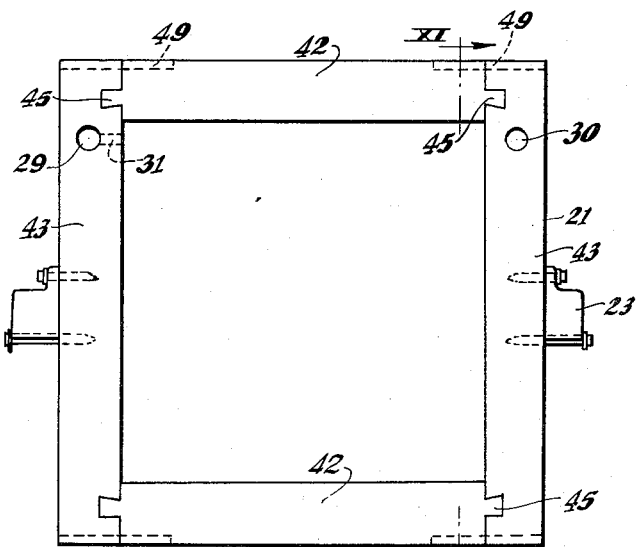
FIG. 10 is a side elevational view of one of the chamber frames with its parts in fully assembled relation.
Figure 11:
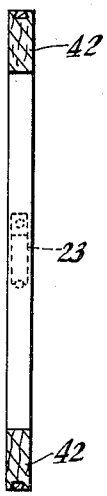
FIG. 11 is a vertical cross-section through the same on the line XI—XI of FIG. 10.

Each inside edge 50 of the upper and lower horizontal rail members 42 of the filter plate frames 20 is profiled longitudinally with a V groove or similar channel 54, FIG. 9, to accommodate the upper and lower ends 51 of the individual drainage strips 44, FIGS. 3–7, and 10, that constitute the drainage area 41.

Figure 12:
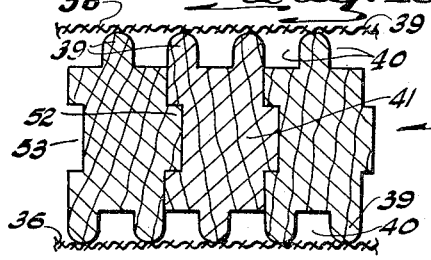
FIG. 12 is a horizontal cross-section taken on the line XII—XII of FIG. 8.

The strips 44 are replaceable individual drainage strips that are machined to a standard cross-sectional pattern, FIG. 7, so that by simply reversing alternate strips, FIG. 12, a regular progression of lands 39 and grooves 40 may be created across each face of the drainage area 41. The loosely fitting tongue 52 and groove 53, FIGS. 3–7, and 10, or similar mechanical joint, serves to mechanically join and align the individual drainage strips.

The ends 51 of the individual drainage strips 44, FIGS. 3a and 9, are machined to conform with and fit into the recessed channel or groove 54 in the filter plate rails 42. The joined side faces of each end of each individual drainage strip are milled back at 55, FIGS. 3–6, and 8, so as to create a slot 56 through the filter plate between each two individual drainage members, and the top and bottoms of the lands terminate short of the rails to form the cross channels 35, 37.

The bottoms of the ends 51 of the individual drainage strips 44 are cut off square, FIGS. 3a, 3, 5, and 9, so as to create an uninterrupted cross channel 54 in the rails which may be utilized for drainage in the lower rail or back washing in the upper rail, depending upon the requirements of the service of the filter press plate.

The strips are the sawn lumber produced as a salvagable by-product in sawing planks from timber. They are preferably in the form of long, narrow, shallow or thin pieces of lumber of the order of 3/4" to 1" in thickness and of a width of 1 1/4" to 2 1/2". This thickness and narrowness is of advantage, in that it lends itself to greater coverage of the filter area 41 with wood preserved with resins, and also to the economy of profiling such pieces of sawn timber into lands and drainage grooves, and nesting tongues and grooves, in a single machine conventional in the sawn lumber art.

In operation, the plates and chamber frames operate in the same manner conventional in the filter plate art of U.S. Patent Office classification of Class 210, subs. 182, 185, 188. The filter press plate and filter chamber frames as designed with wood frames may be disassembled and reassembled by disconnecting and reconnecting their two horizontal rails and two vertical stiles, and the drainage area 41 likewise removed, since it is made up of a number of individually replaceable wood drainage strips. An improved mating joint is created between the wood plates and frames because the grain of the wood of all complemental component members of both the plates and the frame runs, and is aligned, in essentially the same direction, vertical in the stile and strips, and horizontal in the rails. The need for pre-soaking the wood units is eliminated, because only the limited amount of swelling which might occur across the width of the plate stiles must be accommodated and restrained at the rail and stile joints, and the need for full length metallic restraining rods in the assembly of wood plates and frames, and the need to loosen the nuts of the usual full length metallic restraining rods and retightening after presoaking, is also eliminated. The novel mode of construction and operation permits the use of identically machined, individual wood drainage "strips" of readily available wood pieces of otherwise little commercial value, to make up the more valuable drainage area 14 of the filter press plate, and permits the use of such individual wood "strips" as aforesaid as drainage strips by machining them so that they will fit into and be contained by the conforming grooves or channels 54 in the plate rails, and allows an unobstructed flow through the drainage slots 56 to the bottom groove or channel 54 of the plate rail.

The new mode of construction further permits the use of individual wood drainage strips so machined that they will fit into and be contained by the conforming grooves 54 in the plate rails and, combined with the inside edge profile of the rail, provide an unobstructed surface for the cross drainage channels 35, 37 at the top and bottom of the drainage area 41 on each face of the plate, and provides through drainage slots 56 at the top and bottom of the drainage area, where each two individual wood drainage strips are joined together, for pressure equalizing drainage through the plate which will eliminate the danger of plate breakage in the event of voiding adjacent filter chamber areas in the press, and permits dismantling of the filter press plate frame and the replacement of damaged or worn out drainage members, filter press plate frame members, with all component members mechanically profiled and patterned, using automatic, mechanical equipment.

In operation, liquor to be filtered is introduced to the chamber area of frames 21 through channel 29 and ducts 31 in the stiles 43 of the chamber frames 21 and the filtrate passes through the screen 36 to grooves 40 in the grid 41 from which it drains to the bottom cross channels 37, slots 56 and bottom channel 54 to the duct 34 and drain cocks 33. Back wash is introduced through channel 30 and alternate ducts 32 in the stiles 43 of the plate frame 20 to a groove 53 of the filter grid area 41 of plate frames 20, whence it flows through an upper channel 54, slot 56, upper cross channel 35 to grooves 40, through the screen 36, the drain cocks 33 being closed to the alternate grids, to adjacent area in chamber frames 21, thence to the intermediate grid channels 40, their slots 56, channel 54 and their open cocks 33. At intervals, the back wash is then likewise introduced but through the intermediate ducts 32, for flow out through the cocks 33 for the alternate grids 41.

In repair, replacement and renewal, the press is released by hand wheel 28, the frames 20, 21 demounted by removal of the pins and intersectors 47, 49, and the interlocking joints 45 detached, whereupon the strips 44 slide out of the channels 54 in the rails 42. They are restored to the rails in like manner, the joints 45 remounted, the pins and intersectors 47, 49 replaced, and the frames 20, 21 then forced together again by the hand wheel 28.

The invention as herein-above set forth is embodied in particular forms of construction but may be variously embodied within the scope of the claims hereinafter made.

We claim:

1. A filter press unit assembly, comprising: a filter plate frame and a complemental filter chamber frame, each frame comprising a pair of laterally spaced vertical stiles and a pair of separable, upper and lower horizontal rails, all of wood, having its surface and cross-sectional area beneath the surface impregnated with wood preservative and with the grain of the stiles running lengthwise of the vertical stiles and the grain of the rails running horizontal, an impregnated all wood demountable interlocking joint between the rails and the stiles at the corners of the frames, and impregnated demountable intersecting all wood reinforcement in each corner of the frames intersecting the rails and stiles beyond the interlocking joints, the inner sides of the upper and lower rails of the plate frame being constituted of downwardly and upwardly inwardly opening channels extending horizontally from one stile to the other stile of the plate frame, and each frame having channels and ducts therein for inflow of liquid to the frame interiors; and a drainage grid filling the interior chamber area of the plate frame, said drainage grid comprising individual impregnated wood strips of the order of 3/4" to 1" thickness and 1 1/4" to 2 1/2" width and of a height to extend from one rail to the other rail of the plate frame, said strips being disposed with their sides in side-by-side relation in a row, crosswise of the plate frame from one stile to the other stile thereof, and having their narrow edges facing outwardly to be adapted to confront a screen medium when mounted thereon between the plate frame and the void chamber of an adjoining chamber frame in the filter press assembly, the alternate strips of the row having along the longitudinal edge thereof on one side of the grid a central longitudinal land and complemental grooves on opposite sides thereof, and having a central longitudinal groove and two lands on opposite sides thereof along the edge on the opposite side of the grid, the intermediate strips of the row having along their edges on said one side of central longitudinal groove and two lands on opposite sides thereof, and having along their edges on the opposite side of the grid a central longitudinal land and two complemental longitudinal grooves on opposite sides thereof, each strip having a tongue and groove on their opposite sides for nesting together in the row, each of the strips having on their confronting side faces a reduced portion at its upper and lower ends to form with the rails a crosswise drainage slot interconnecting the longitudinal grooves and a seat portion for removable seating of the strips in the inwardly opening channels of the upper and lower rails, said seat portion terminating short of the upper and lower extremities of the lower and upper rails to form liquid flow passages along the top of the seats in the rails, and the parts of the seat portions on the opposite sides of the row of strips being offset inwardly from the edges of the strips at a region beyond their reduced portions which form said crosswise drainage slots, to form a liquid passage that interconnects said longitudinal grooves in the grid with said drainage slots.

2. A filter press unit comprising: a drainage grid for filling the interior chamber area of a plate frame having laterally spaced vertical stiles and upper and lower rails, said drainage grid comprising individual wood strips of the order of ¾" to 1" thickness and 1¼" to 2½" width and of a height to extend from one rail to the other rail of the frame, said strips being disposed with their sides in side-by-side relation in a row, crosswise of the plate frame from one stile to the other stile of the frame, and having their narrow edges facing outwardly to be adapted to confront a screen medium when mounted thereon between the plate frame and the void chamber of an adjoining chamber frame in use in a filter press, the alternate strips of the row having along their longitudinal edges on one side of the grid a central longitudinal land and complemental longitudinal grooves on opposite sides thereof, and having a central longitudinal groove and two longitudinal lands on opposite sides thereof along the edge on the opposite side of the grid, the intermediate strips of the row having along their edges on said one side a central longitudinal groove and two longitudinal lands on opposite sides thereof, and having along their edges on the opposite side of the grid a central longitudinal land and two complemental longitudinal grooves on opposite sides thereof, each strip having a tongue and groove on their opposite sides for nesting together in the row, each of the strips having on their fronting faces a reduced portion at its upper and lower ends forming with the rails a crosswise drainage slot interconnection with the longitudinal grooves and a removable seat for seating in inwardly opening channels of the rails of the frame, said seats terminating short of the upper and lower extremities of the lower and upper rails of the frame to form liquid flow passages along the top of the seats in the rails, and the portions of the seats on opposite sides of the grid being offset inwardly from the edges of the strips at a region beyond their reduced portions which form said crosswise drainage slots, to form a liquid passage that interconnects said longitudinal grooves in the grid with said drainage slots.

3. A filter press unit as claimed in claim 2 and in which each of the strips is impregnated over all of its surface and throughout the cross-sectional area beneath the surface with wood preservative.

4. A filter press unit assembly, comprising: a filter plate frame and complemental filter chamber frame, each frame comprising a pair of laterally spaced vertical stiles and a pair of separable, upper and lower horizontal rails, all of wood, having its surface and cross-sectional area beneath the surface impregnated with wood preservative and with the grain of the stiles running lengthwise of the vertical stiles and the grain of the rails running horizontal, an impregnated all wood demountable interlocking joint between the rails and the stiles at the corners of the frames, and impregnated demountable all wood reinforcement in each corner of the frames intersecting the rails and stiles beyond the interlocking joints, the inner sides of the upper and lower rails of the plate frame being constituted of downwardly and upwardly inwardly opening channels extending horizontally from one stile to the other stile of the plate frame, and each frame having channels and ducts therein for inflow of liquid to the frame interiors; and a drainage grid filling the interior chamber area of the plate frame, said drainage grid comprising individual impregnated wood strips of the order of ¾" to 1" thickness and 1¼" to 2½" width and of a height to extend from one rail to the other rail of the plate frame, said strips being disposed with their sides in side by side relation in a row, crosswise of the plate frame from one stile to the other stile thereof, and having their narrow edges facing outwardly to be adapted to confront the void chamber of an adjoining chamber frame in the filter press assembly, the alternate strips of the row having along the longitudinal edge thereon on one side of the grid a central longitudinal land and complemental grooves on opposite sides thereof, and having a central longitudinal groove and two lands on opposite sides thereof along the edge on the opposite side of the grid, the intermediate strips of the row having along their edges on said one side a central longitudinal groove and two lands on opposite sides thereof, and having along their edges on the opposite side of the grid a central longitudinal land and two complemental longitudinal grooves on opposite sides thereof, each strip having a tongue and groove on their opposite sides for nesting together in the row, and means for removably securing the strips to the upper and lower rails of the plate frame.

References Cited in the file of this patent

UNITED STATES PATENTS

| | | |
|---|---|---|
| 1,316,404 | Wilson | Sept. 16, 1919 |
| 1,330,331 | Miller | Feb. 10, 1920 |
| 1,569,627 | Goetschuis et al. | Jan. 12, 1926 |
| 2,895,848 | Baker | July 21, 1959 |

FOREIGN PATENTS

| | | |
|---|---|---|
| 124,974 | Great Britain | Apr. 10, 1919 |
| 455,487 | Italy | Mar. 1, 1950 |

OTHER REFERENCES

Sperry Filter Presses Catalog #7, published prior to July 1957, D. R. Sperry & Co., Batavia, Ill.

Design and Selection of Hyperbolic Cooling Towers, by R. F. Rish and T. F. Steel, January 1960; Combustion, page 47 (presented before the American Society of Civil Engineers Symposium on Thermal Plants, October 1958).